United States Patent  [15] 3,679,119
Copping  [45] July 25, 1972

[54] INJECTION MOULDED PLASTIC CUP-LIKE ARTICLE

[72] Inventor: Keith Philip Copping, 24 Brian Cliff Drive, Don Mills, Ontario, Canada

[22] Filed: June 1, 1970

[21] Appl. No.: 42,413

Related U.S. Application Data

[63] Continuation-in-part of Ser. No. 759,845, Sept. 16, 1968, abandoned.

[52] U.S. Cl. ............................................................ 229/1.5
[51] Int. Cl. ........................................................ B65d 3/06
[58] Field of Search ...................... 229/1.5 B, 1.5 R, 1.5 C; 220/72; 18/4.2

[56] References Cited

UNITED STATES PATENTS 3,169,688  2/1965  Schad ............................... 229/1.5 B
3,169,689  2/1965  Schwartz ........................... 229/1.5 B
3,141,913  7/1964  Edwards ............................ 229/1.5 B Primary Examiner—Evon C. Blunk
Assistant Examiner—I. Kenneth Silverman
Attorney—Brian Thorpe, Arne I. Fors, Frank I. Piper and James T. Wilbus

[57] ABSTRACT

The disclosure sets forth an injection moulded cup-like plastic article characterized by point of injection and a moulding terminus and having as a major structural element thereof a wall embodying superposed ribs defining a cross-lattice network dividing the wall into segmental rectangular web portions entirely bounded by the ribs, the ribs being directed at an angle to a theoretical line of shortest distance between the injection point and the moulding terminus.

9 Claims, 10 Drawing Figures

PATENTED JUL 25 1972 3,679,119

INVENTOR
KEITH P COPPING

BY Cavanagh & Norman

INVENTOR
KEITH P COPPING

BY *Cavanagh & Norman*

INJECTION MOULDED PLASTIC CUP-LIKE ARTICLE

This application is filed as a continuation-in-part of my earlier application, now abandoned, filed on Sept. 16, 1968 under Ser. No. 759,845 and entitled 'INJECTION MOULDED ARTICLES AND PROCESS THEREFOR.'

This invention relates to an injection moulded plastic cup-like article having a high performance structural wall.

Especially in the field of injection moulding of plastic containers and particularly of containers of the cup-like type such as, for example, for holding beverages, the production volume of such articles of manufacture demands minimum cost. Accordingly, the utilization of minimum volume such as on an injection mouldable thermoplastic material is of primary importance, providing the required structural strength can be achieved. There have been developments over a number of years which have provided in the injection moulding of cup-like plastic articles an apparent minimum of material volume with a satisfactory strength in the end product by using reinforcing stringers, beads or channels aligned in the direction of mould filling or moulding and relatively closely spaced together, thus to permit a minimum of wall material extending between such ribs. There is nevertheless a severe limitation in the thinness to which a wall may be formed by injection moulding techniques even with the provision of a substantial number of even closely spaced ribs aligned in the direction of mould filling or moulding. For example, the forming of containers such as plastic garbage pails may require a minimum wall thickness of the order of ⅛ inch or greater. While such wall thicknesses may be thought to be dictated by strength requirements, the problem of mould filling in the injection moulding of plastic articles, especially of container form, may require mould feeders or conduits for plastic material. According to prior best practice, such feeders should be in the direction of mould filling by way of the shortest distance to the furthest point at which the mould is to be filled.

An analysis of prior container designs as to distribution and efficient utilization of the material to define a wall with satisfactory rib reinforcing results in a volume ratio number for material utilization which is a function of structural efficiency or strength/weight ratio for a given load and deflection. Such a number may be regarded as a performance number in terms of volume of material used or weight of material used. Thus, for example, in a prior art coffee cup in which the wall is considered to be of uniform thickness under the ribs and the ribs to be superimposed thereon, the ratio of the material in the wall divided by the material in the ribs and in turn divided by the total material in the article gives a performance number which may be regarded as a structural and material distribution efficiency number. Thus, for example, one 7 ounce content coffee cup of the form shown in U.S. Pat. No. 3,169,688 issued Feb. 16th, 1965 to R. D. Schad had a total weight as supplied to the commercial market of 9.6 grams. The wall to rib ratio of the lightest of such commercial Schad cups is 2.56; thus, the performance number ($P_n$) of the commercial Schad cup is:

$P_n = W/R/T$      $P_n = (2.56/9.6) \times 100$
W—weight of wall           $= 25.6$
R—weight of ribs
T—total weight of article This is a typical very thin coffee cup performance number of the containers of the prior art, all of which have a performance number of less than 40 if difficulty in mould filling is to be avoided and generally satisfactory strength is to be achieved.

The present invention departs from the prior art in the concept of the thinness of wall which may be achieved and in the direction in which a mould may be filled to permit the design of thin-walled containers and thin wall structures with a substantial saving in material while minimizing mould filling problems.

It is also an object of the invention to provide a container such as a seven ounce beverage container injection moulded from thermoplastic material of a weight of the order of about ⅔rds or less of the weight of a minimum weight prior art injection moulded plastic cup but of corresponding or improved strength.

It is another object of the invention to provide a structural plastic wall for a container or other article having ribs or feeding ducts extending at an angle to the shortest distance between the feed point of the mould and the end of the mould and embodying superposed ribs of correspondingly complementary angle defining with said first ribs a lattice network, said network embodying a leakage path by virtue of which a web structure is formed and fed from said ribs or feeding channels in a manner segmenting the total area of the article into essentially small web areas bounded entirely by said rib feeding channels, and in which the total volume of the webs is a minimum and comprises a major portion of the material of the article.

It is a further object of the invention to provide a container structure of a performance number substantially greater than 50 and of the order of as high as 90 or greater.

With the foregoing and other objects in view, the invention generally concerns an injection moulded plastic article characterized by a point of injection and a moulding terminus, and having as a major structural element thereof a continuous wall element of uniform thickness and superposed ribs thereon forming a cross-latticed network dividing said wall into segmental rhomboidal web portions entirely bounded by said ribs, said ribs being directed at an angle to a line of shortest distance between the injection point and the terminus of the article.

Other objects of the invention will be appreciated by a study of the following specification taken in conjunction with the accompanying drawings.

IN THE DRAWINGS

Figure 1:
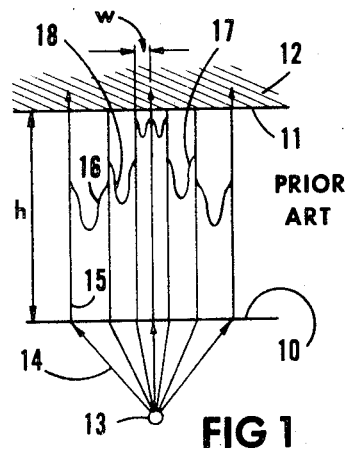
FIG. 1 is a diagrammatic illustration of the conventional technique for filling a mould having ribs from an injection point to a mould terminus by aligning the ribs as feeding channels in alignment with the shortest distance between the injection point and the terminus.

In FIG. 1, the distance $h$ represents the shortest distance between a starting edge 10 and a finishing edge or terminus 11 defined by mould wall 12 and between which a thin plastic wall is to be formed by injecting a plastic from an injection point 13 through leader channels 14 to differently laterally spaced rib mould conduits 15. It is to be understood that the mould is such that a space of uniform and lesser thickness exists between the rib conduits 15. As the thickness of the wall to be moulded is reduced, the injection pressure must be increased. Even when the rib conduits are very close together, the minimum thickness of wall which can be injection moulded is of the order of only about 1/10th the distance $w$ between the rib conduits or channels. Even then, great difficulties will be encountered in mould filling and there will be a tendency for the wall to form partially only as indicated by the wall limits 16, 17, and 18, it being evident that the closer the rib channels are together, the greater the degree of success which may be achieved in casting thin-walled articles.

As a part of the concept of the invention, a departure from the well-established practice of the prior art as exemplified by FIG. 1 is to cause the feeding conduits, ribs or channels to be inclined at an angle A relative to the line of shortest distance $h$ between a beginning edge 19 of a wall and the terminus 20 of a wall defined by a mould wall 21 in which an injection point 22 communicates injected plastic material by feeder ducts 23 to a plurality of inclined parallel spaced-apart rib ducts or feeders 24. Such technique of the invention increases the transit time of plastic flow in the rib ducts 24 from the first initial edge of the wall being formed to the terminal edge 20, and thus permits the slower rate of flow in the web areas 25 of the wall being formed to accomplish a transit time to fill such web area when the flow is more vertical or more direct, which is closer to the transit time in the inclined ribs, thus to accomplish a more uniform wall formation. It has been found that a superior control of mould filling in the injection of a thin wall may be achieved by the partial technique of the invention indicated in FIG. 2, but the unidirectional nature of such rib structure suffers from the same disadvantage of prior unidirectionally ribbed structures, such as found in a ribbed coffee cups of the prior art, which are particularly weak in the longitudinal direction of the ribs under transverse loading.

Figure 3:
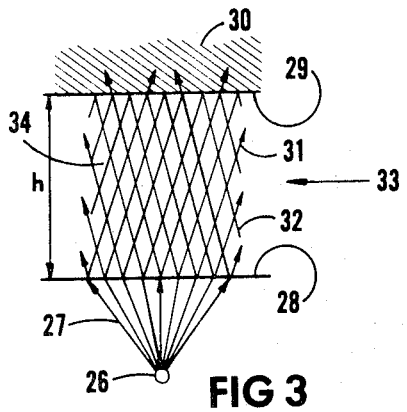
FIG. 3 is an injection diagram corresponding to FIGS. 1 and 2 but conforming to the full principles of this invention, in which rib feeding channels are disposed to provide a substantial equiangular lattice network each at an angle with respect to the line of shortest distance from the terminus of the mould or article.

Referring to FIG. 3, the full application of the concept of the invention is illustrated in the injection of plastic material under pressure at an injection point 26 proceeding by ducts or feeders 27 as before to an initial wall edge 28 and rising therefrom at an angle to the line of shortest distance $h$ between edge 28 and the terminal edge 29 of the wall to be produced and defined by end mould wall 30 and characterized by superposed rib channels 31, 32 in a cross-lattice network 33 dividing the wall into segmental rhomboidal web portions 34, entirely bounded by said ribs. In this way, each of the discrete web portions 34 is formed by its boundary of rib channels or ducts feeding plastic material into such area in the manner indicated in FIG. 4 and represented by the flow arrows 35, 36, 37 and 38.

Figure 5:
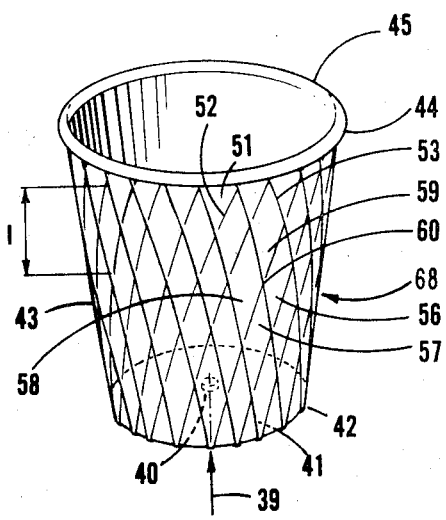
FIG. 5 is a perspective view of a beverage cup formed according to the invention with a lattice rib and wall segment sidewall.
Figure 4:
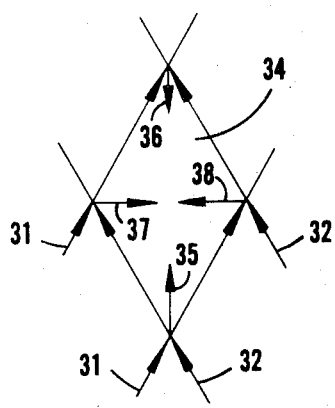
FIG. 4 is an injection diagram of forces controlling plastic flow about a segmental rhomboidal wall web portion of FIG. 3.

The technique of FIGS. 3 and 4 is utilized in forming the cup of FIG. 5, said cup having a central point of injection 39 in the center 40 of the bottom wall 41 which feeds the initial or bottom edge 42 of sidewalls 43 defining a structural wall having a terminus 44 defined by a suitable rim structure 45. The sidewalls 43 are the main structural element.

The formation of a very thin sidewall, such as for a cup 68 of FIG. 5 has as its objective the saving of material and the reduction of moulding time, and thus high rates of production from the same moulding machine. The lesser the thickness of material in each article, the lesser the hardening time and the higher the production rate.

Figure 6:
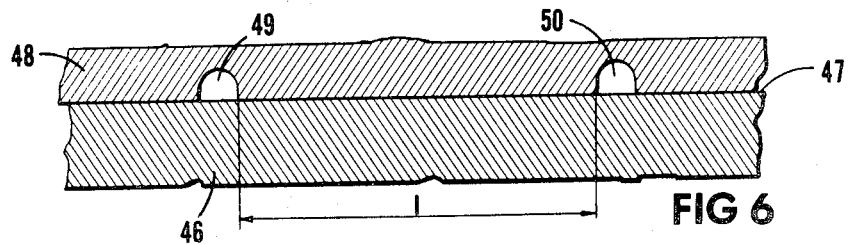
FIG. 6 represents two mould parts having two parallel spaced-apart rib channels in which the parts of the mould are fully engaged on the parting line.

The formation of thin walls is severely limited according to prior art practice. Prior art technique requires the use of feeding ribs or channels in the direction of plastic flow desired, which in practice is deemed to be in the direction of the shortest distance to fill the mould. In an extreme case, one may consider the mould parts shown in FIG. 6, in which one mould part 46 is adapted to be fully engaged to define a sealed parting line 47 by a mould part 48, the latter carrying rib channels 49 and 50 spaced apart a suitable distance $l$. In the fully engaged position of the mould parts shown in FIG. 6, spaced apart ribs only would be cast by the mould rib ducts 49, 50 and no wall formation would be provided therebetween.

Figure 2:
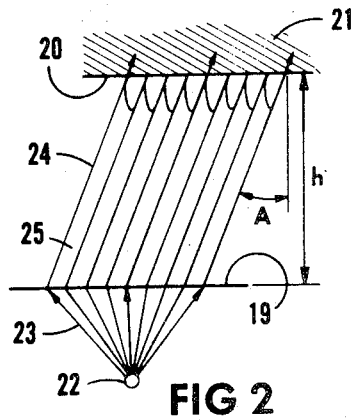
FIG. 2 is an injection diagram similar to that of FIG. 1, but illustrating the effect of aligning the rib feeding channels at an angle A to the line of shortest distance between the injection point and the terminus of the mould, being a part only of the principle of this invention.
Figure 7:
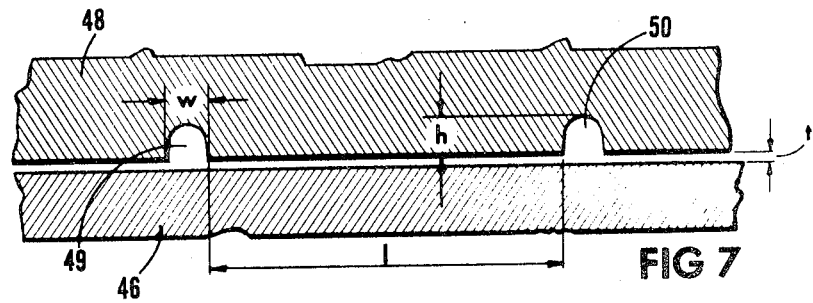
FIG. 7 is a view similar to FIG. 6 but with the mould slightly separated along the parting line to permit leaking.

Referring to FIG. 7, as the mould parts 46, 48 are separated to define a gap $t$, the conditions described with reference to FIGS. 1 and 2 will be encountered. It will be evident that the resistance to plastic flow in the rib channels 49 and 50 will be less than in the gap $t$ while the gap is very small. The prior art has generally established, however, that not only for structural reasons but for mould filling purposes the distance $l$ between the feeder channels or ribs 49 and 50 should not be greater than about 10 $t$. While very high pressure moulding techniques will permit a larger dimension for $l$ where one is attempting to keep $t$ a minimum practical performance in such prior moulding techniques has effectively limited the thinness of the wall to be produced even with high moulding pressures of the order of 25,000 p.s.i. to about 18/1000ths of an inch minimum. It will be evident in the techniques of FIGS. 1 and 2 that the plastic flowing in the gap $t$ must rise through a long path, and while it is fed to a considerable degree from the rib channels described as the distance $l$ is increased relative to the gap $t$, it will become more difficult to fill that area of the gap half way between the rib channels. Thus, aside from structural considerations, mould filling problems in prior art techniques become dominant in the formation of thin walls and especially of thin-walled containers, and lead to the provision of larger vertically directed feeding ribs than structural requirements alone dictate. It is this condition which the invention alleviates, which will be evident from a further review of FIGS. 3 and 4, from which it will be apparent that each of the discrete web areas 34, being entirely bounded by feeding channels 31 and 32, and fed from all directions from the edges of such web segments, reduces the feeding distance to fill said web to approximately one-half its least dimension. Accordingly, the ribs of the invention may be widely spaced. Furthermore, the ribs in their size and amount of material utilized may be restricted to a size conforming with structural requirements.

Thus, in comparing coffee cups of the same physical size as the invention with minimum wall good practice of the prior art, the following table is of interest:

|  | Invention | Prior Art (A) | Minimum Prior Art (B) |
| --- | --- | --- | --- |
| continuous wall | 4.7 | 5.9 | 6.1 |
| rib outside wall | 0.7 | 2.3 | 1.3 |
| Bottom including bottom feeders | 0.9 | 0.9 | 0.9 |
| rim | 0.5 | 0.5 | 0.5 |
| Total weight | 6.8 grams | 9.6 grams | 8.8 grams |
| Performance Number | 98.5 | 26.8 | 53.4 |

Referring to the above table, it is to be observed that the minimum prior art weights (B) are for a prior art coffee cup of the Schad type but having no lateral reinforcing ribs, and in which the wall thickness is of the order of 18/1000ths of an inch. Such cup having no lateral bands has been made at very high this pressures but is not of satisfactory structural strength as compared with the cup of prior art (A) and will split vertically between the ribs quite readily upon application of encircling or laterally applied finger pressure. The cup of prior art (A) is of the lateral band reinforced Schad type and is of interest from a strength point of view as to required structural ability necessary and provided by the structure of the invention illustrated in FIG. 5 hereof.

Also in the above table are listed the performance numbers $P_n$ of each of the cup types from which it will be evident that the performance number of the cup of the invention greatly exceeds the structurally accepted cup of the prior art of column (B). Furthermore, the total weight of material of the cup of the invention on this comparative basis is less than 71 percent of the weight of material in prior art (A) and only 78 percent of the weight of material of minimum prior art (B). The structural strength of the cup of the invention appears to be equivalent to that of prior art (A). This is due not only to the lattice reinforcing of the wall elements 43 by the ribs 52 and 53, but also appears to be due to a grain or directional characteristic of moulding resulting from the lattice feeding and formation of the article.

A major limitation of the functional strength of any injection moulded plastic product, particularly products moulded from the "brittle" plastics such as polystyrene which have a narrow range freezing point is the pattern of stress which is frozen into the plastic at the instant of transition from the molten state to the solid state within the rigid confines of the mould.

The stress condition in a thin-walled plastic product such as a container whose walls are of equal thickness throughout is extremely severe because the entire wall solidifies at the same instant and the stress has no opportunity of relieving itself in the unyielding confines of the still-closed mould. The presence of intersecting ribs according to the invention appears to change these conditions completely and to create a different order of circumstances. The wall does not freeze throughout at the same instant because of the substantial difference in the material mass through a rib section as compared with that of the thin wall web or segment between the ribs. The thinner basic wall sections or web segments between the ribs freeze first. A significant portion of the stress which would be normally locked into a non-ribbed wall distributes into the still-molten ribs which surround each wall web area on all sides. The residual stress in the discrete web areas between the ribs is substantially relieved. Remainder stress is isolated by the discrete nature of each web area within its boundary of ribs of greater thickness. Moulding stress conditions may be relieved further by building up the material mass at the point of intersection of the ribs.

Certain aspects of the above suggestions offered by way of explanation of apparently enhanced structural ability due to grain orientation and control in the moulding of plastic articles may be further studied in an article entitled "Injection Moulding of Shapes of Rotational Symmetry with Multi-Axial Orientation" by Kenneth J. Cleereman, reported in SPE Journal, Oct. 1967, pages 43–47.

Figure 8:
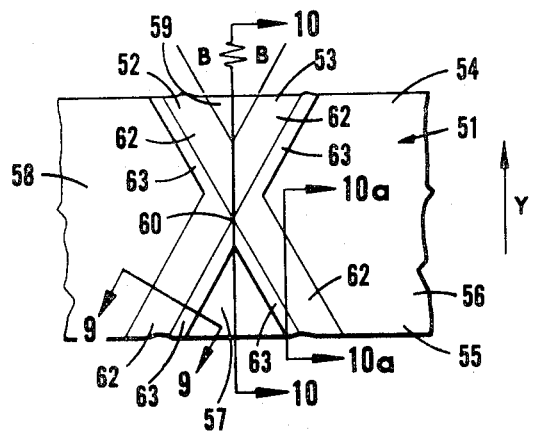
FIG. 8 is a fragmental enlarged view of a cross-over rib juncture of lattice ribs of the invention.
Figure 10:
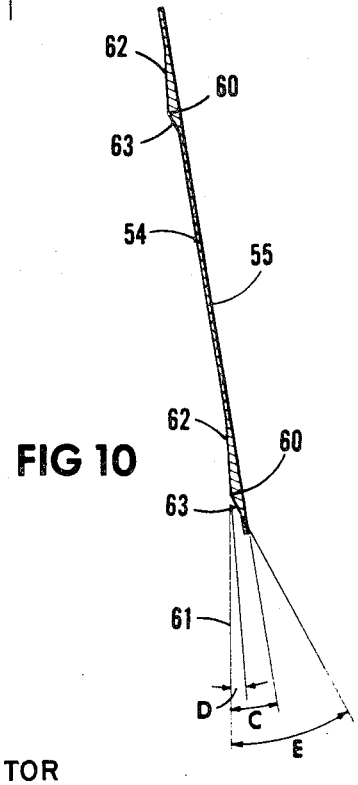
FIG. 10 is a section on the line 10—10 of FIG. 8 and also represents a section on the line 10a—10a of FIG. 8.
Figure 9:
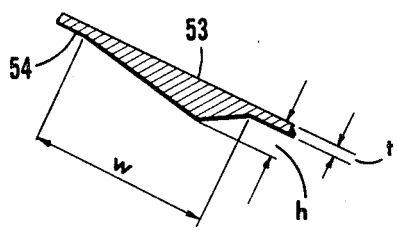
FIG. 9 is a section on the line 9—9 of FIG. 8.

In FIG. 8, an enlarged fragment of one kind of wall formation according the invention is illustrated, wherein the wall fragment 51 is adapted to be moulded by thermoplastic injection in the direction of the arrow y, and embodies sloped surfaces for mould draft and mould separation in the direction of the arrow y. In this case, the ribs 52 and 53 oppositely inclined by an equal angle B with respect to the line of shortest distance and direction of mould filling also in the direction of arrow y both rise outwardly from an exterior surface 54 of the underlying wall structure 55 which includes segmental web portions 56, 57, 58 and 59. The upper surfaces of said ribs affect the shape configuration of the ribs to make mould stripping possible in the separation direction of the arrow y. Thus, on the section 10—10 at rib cross over region 60 shown in FIG. 10 it will be seen that the outer surfaces 54 or wall 55 are a draft angle C of the order of about seven degrees from the vertical 61. The upper faces 62 of the ribs are at a vertical positive draft angle from the vertical 61, as shown by angle D, of the order of two to three degrees, whereas the under surface 63 of such ribs is at a much larger angle E of the order of about 30 degrees. In transverse section, one of the ribs 53, as shown in FIG. 9, is limited by the geometry required for satisfactory draft angles in the height $h$ of the rib rising above web surface 54 relative to the thickness $t$ of the web. The apparent height $h$ of the rib may thus be increased by increasing the effective width $w$ of the rib, thus reducing the effective size of the rhomboidal segmental webs 55.

The invention contemplates that the lattice rib work herein may be provided on opposite sides of a wall. In such instance the ribs would appear to spiral substantially in parallel in one direction on each surface, but the direction of spiral will be opposite on such surfaces whereby the thickness of plastic material at a juncture would be $2h+t$, rather than merely $h+t$ at such a cross over region. Furthermore, it will be understood that a lattice rib pattern may be provided on say an external surface while an additional lattice rib pattern is provided on an internal surface. If the interior lattice is spaced out of alignment with, but parallel to, the outer lattice, that is, if it is spaced say half the distance therebetween, it will be apparent that the web area would be effectively divided in half. In this way, the apparent size of the webs may be doubled, whereas in fact they remain effectively of the same size. The article would appear to have half the number of ribs on the outside surface as would otherwise be required if all of the rib lattice were on the exterior surface. It is intended, therefore, that the lattice rib structure rising from surfaces of a wall of uniform thickness essentially to divide said wall into discrete rhomboidal segmental areas may be provided by inclined ribs defining a cross lattice on one surface, on both surfaces, or by different direction of rib alignment on opposed surfaces. The cup-like articles of the invention may take the form of shallow, round or square articles having side walls embodying the invention and, if desired, the invention also expressed in lattice rib configuration in the bottom wall.

I claim as my invention:

1. An injection moulded plastic article comprising a bottom wall and continuous side wall, a point of injection centrally located in the bottom wall and a moulding terminus defined by a rim on the side wall, and ribs integral with and superposed on at least one surface of said side wall, said ribs being solid in transverse section and forming a cross lattice network on the said wall surface dividing said wall surface having said cross lattice network into a plurality of discrete rhomboidal web portions entirely bounded by said ribs; said ribs each being directed at an acute angle to a theoretical line of shortest distance in said wall between the injection point and the moulding terminus of the article.

2. The article of claim 1 in which the wall extends in frusto-conical configuration to define with the remainder of said article a cup-like open-ended container.

3. The article of claim 2 wherein the performance number comprising the ratio of the weight of plastic in the wall divided by both the weight of the ribs and the weight of the total article multiplied by 100 is greater than 40 and the thickness of said rhomboidal web portions of said wall is less than 18/1000ths of an inch.

4. The article of claim 1 in which the aggregate weight of the material of the ribs thereof is less than 2/10 of the weight of the material of the wall.

5. The article of claim 1 in which the minimum unsupported diagonal dimension of any said rhomboidal web portion of said wall is greater than $10t$ where $t$ represents the thickness of the wall.

6. The article of claim 1 in which the performance number comprising the ratio of the weight of moulding material in the wall divided by both the weight of the ribs and the weight of the total article multiplied by 100 is greater than 40.

7. The article of claim 1 in which the thickness of said rhomboidal web portions of said wall is less than 18/1000ths of an inch.

8. The article of claim 1 in which the grain of the plastic moulding material constituting the article is uni-directionally orientated along the longitudinal axis of each rib bounding each said rhomboidal web portion of said wall and wherein the grain is multi-directionally orientated within said web portion.

9. The article of claim 1 in which the ribs are substantially triangular as viewed in oblique section in parallel with a said theoretical line of shortest distance in said wall, and the plane of the triangle side on the moulding terminus side of the triangle is at a positive draft angle in relation to the vertical axis of the article of not less than one degree and not greater than the draft angle of the wall of the article minus one degree.

* * * * *